US010697360B2

(12) United States Patent
Kimura

(10) Patent No.: US 10,697,360 B2
(45) Date of Patent: Jun. 30, 2020

(54) INTERNAL COMBUSTION ENGINE CONTROL METHOD AND INTERNAL COMBUSTION ENGINE CONTROL DEVICE

(71) Applicant: NISSAN MOTOR CO., LTD., Yokohama-shi, Kanagawa (JP)

(72) Inventor: Yoshiyasu Kimura, Kanagawa (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 16/606,302

(22) PCT Filed: Apr. 19, 2017

(86) PCT No.: PCT/JP2017/015663
§ 371 (c)(1),
(2) Date: Oct. 18, 2019

(87) PCT Pub. No.: WO2018/193532
PCT Pub. Date: Oct. 25, 2018

(65) Prior Publication Data
US 2020/0131980 A1 Apr. 30, 2020

(51) Int. Cl.
F02B 37/18 (2006.01)
F02D 41/00 (2006.01)

(52) U.S. Cl.
CPC ........ F02B 37/183 (2013.01); F02D 41/0007 (2013.01)

(58) Field of Classification Search
CPC .. F02B 37/18–186; F02B 37/22; F02B 37/24; F02D 41/0007; F01D 17/165

USPC ........................................................ 60/602
See application file for complete search history.

(56) References Cited

U.S. PATENT DOCUMENTS

2010/0242470 A1 9/2010 Wang et al.
2011/0041493 A1* 2/2011 Doering .............. F02D 41/0007
60/603

FOREIGN PATENT DOCUMENTS

DE 10 2007 025 077 A1 12/2008
JP 2002-54446 A 2/2002
JP 2007-303330 A 11/2007
WO WO-2007/046783 A1 4/2007

* cited by examiner

Primary Examiner — Laert Dounis
Assistant Examiner — Edward Bushard
(74) Attorney, Agent, or Firm — Foley & Lardner LLP

(57) ABSTRACT

An internal combustion engine includes: a turbocharger including a compressor and an exhaust turbine; a wastegate valve for allowing a part of exhaust gas to bypass the exhaust turbine and flow into a downstream side of the exhaust turbine, wherein the exhaust gas is to be brought into the exhaust turbine; and an exhaust adjustment mechanism for adjusting a quantity of the exhaust gas. A control method includes operating a first one of the wastegate valve and the exhaust adjustment mechanism with higher priority to a second one of the wastegate valve and the exhaust adjustment mechanism in response to a condition where an intake air quantity is to be varied along with a variation in engine load or air fuel ratio, wherein operation of the first one allows thermal energy to be recovered more efficiently under the condition than that of the second one.

10 Claims, 9 Drawing Sheets

INTERNAL COMBUSTION ENGINE CONTROL METHOD AND INTERNAL COMBUSTION ENGINE CONTROL DEVICE

BACKGROUND

The present invention relates to an internal combustion engine control method and an internal combustion engine control device for an internal combustion engine provided with a turbocharger.

Japanese Patent Application Publication No. 2007-303330 (JP 2007-303330 A) discloses an internal combustion engine provided with a turbocharger and a wastegate valve, wherein the turbocharger is a variable nozzle type turbocharger structured to adjust a state of boost by adjusting a vane angle (or nozzle opening) of an exhaust turbine, and wherein the wastegate valve is structured to allow a part of exhaust gas to bypass the exhaust turbine of the turbocharger and flow into a downstream side of the exhaust turbine, wherein the exhaust gas is to be brought into the exhaust turbine.

JP 2007-303330 A discloses controlling the nozzle opening of the exhaust turbine and a valve opening of the wastegate valve when in a transient state.

However, no sufficient study has been made on efficient control of the wastegate valve and the nozzle opening of the exhaust turbine when in a transient state where an intake air quantity of the internal combustion engine is to be varied. Therefore, there is room for further improvement.

SUMMARY

According to one or more embodiments of the present invention, an internal combustion engine control method for an internal combustion engine, the internal combustion engine including: a turbocharger including an exhaust turbine; a wastegate valve structured to allow a part of exhaust gas to bypass the exhaust turbine and flow into a downstream side of the exhaust turbine, wherein the exhaust gas is to be brought into the exhaust turbine; and an exhaust adjustment mechanism structured to adjust a quantity of the exhaust gas; the internal combustion engine control method comprises: operating a first one of the wastegate valve and the exhaust adjustment mechanism with higher priority to a second one of the wastegate valve and the exhaust adjustment mechanism in response to a condition where an intake air quantity is to be varied, wherein operation of the first one allows thermal energy to be recovered more efficiently under the condition than that of the second one.

The configuration described above makes it possible to recover thermal energy efficiently as a work of boost pressure. This serves to reduce a pumping loss, and thereby enhance fuel efficiency of the internal combustion engine.

DETAILED DESCRIPTION

The following describes an embodiment of the present invention in detail with reference to the drawings.

Figure 1:
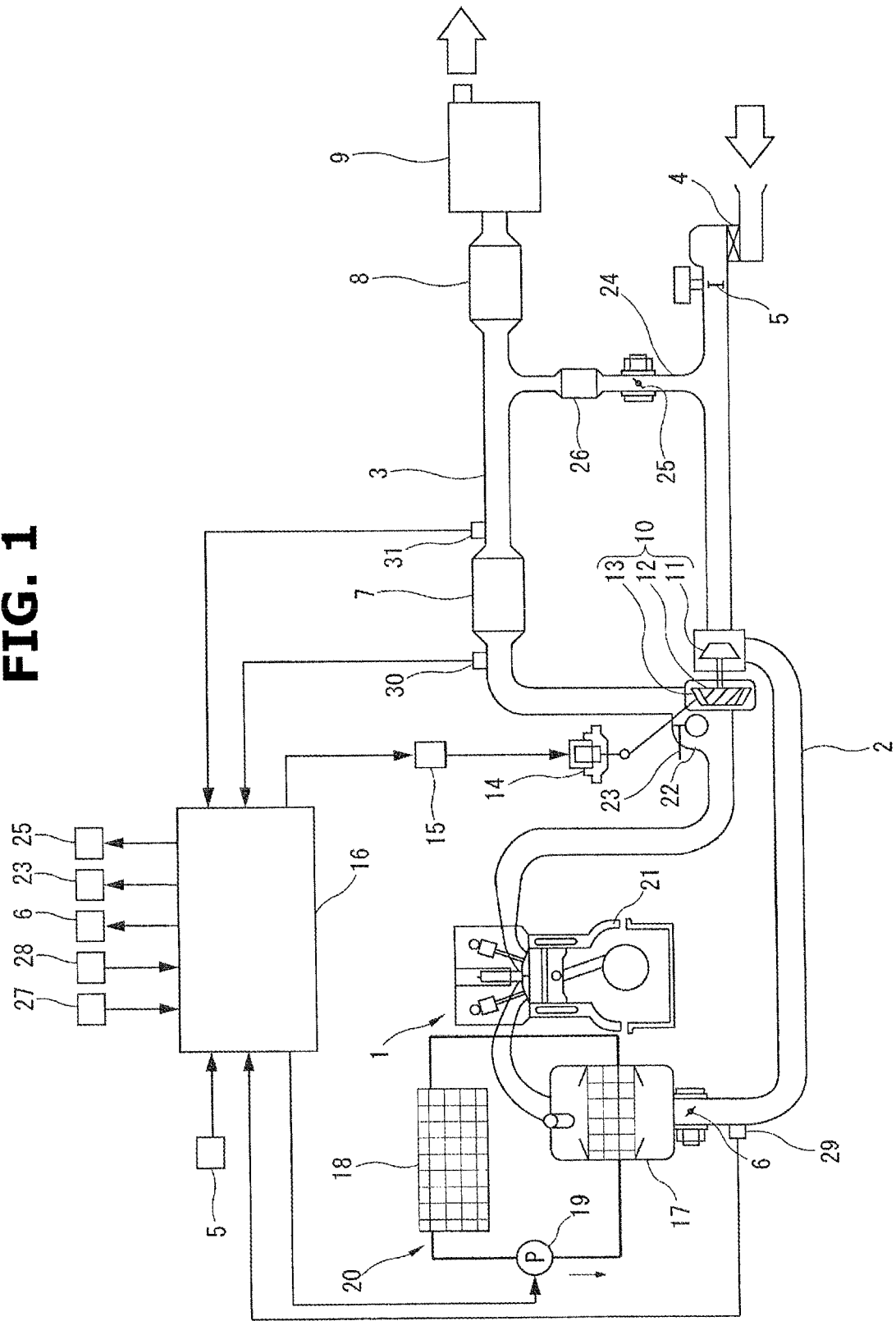
FIG. 1 is an illustrative view schematically showing a general configuration of an internal combustion engine control device according to one or more embodiments of the present invention.

FIG. 1 is an illustrative view schematically showing a general configuration of a control device for an internal combustion engine 1.

Internal combustion engine 1 has an in-cylinder direct injection configuration in this example, wherein each cylinder is provided with a fuel injection valve not shown for injecting fuel into the cylinder.

Internal combustion engine 1 is mounted as a drive source on a vehicle such as an automotive vehicle, and is provided with an intake passage 2 and an exhaust passage 3.

Internal combustion engine 1 is connected to intake passage 2 in which an air cleaner 4, an air flow meter 5, and a throttle valve 6 are provided, wherein air cleaner 4 is structured to collect foreign matter contained in intake air, wherein air flow meter 5 is structured to sense an intake air quantity, and wherein throttle valve 6 is an electronic throttle valve structured to adjust the intake air quantity. Air flow meter 5 is arranged upstream of throttle valve 6. Air flow meter 5 includes a temperature sensor inside, and is structured to sense a temperature of intake air at an intake inlet. Air cleaner 4 is arranged upstream of air flow meter 5. Intake passage 2 is placed in an engine room in which internal combustion engine 1 is mounted.

Internal combustion engine 1 is connected to exhaust passage 3 in which an upstream exhaust catalyst 7, a downstream exhaust catalyst 8, and a muffler 9 are provided, wherein upstream exhaust catalyst 7 is a three-way catalyst or the like, wherein downstream exhaust catalyst 8 is a NOx trap catalyst or the like, and wherein muffler 9 is structured to reduce an exhaust sound. Downstream exhaust catalyst 8 is arranged downstream of upstream exhaust catalyst 7. Muffler 9 is arranged downstream of downstream exhaust catalyst 8.

Internal combustion engine 1 is further provided with a turbocharger 10 including a compressor 11 and an exhaust turbine 12, wherein compressor 11 and exhaust turbine 12 are arranged coaxially, wherein compressor 11 is disposed in intake passage 2, and exhaust turbine 12 is disposed in exhaust passage 3. Compressor 11 is arranged upstream of throttle valve 6 and downstream of air flow meter 5. Exhaust turbine 12 is arranged upstream of upstream exhaust catalyst 7. Turbocharger 10 is a variable capacity type turbocharger including a variable nozzle 13 structured to adjust a capacity of turbocharger 10. Specifically, when variable nozzle 13 is set to have a small nozzle opening, variable nozzle 13 has characteristics of small capacity suitable for a condition such as a low speed region where a flow rate of exhaust gas is low. When variable nozzle 13 is set to have a large nozzle opening, variable nozzle 13 has characteristics of large capacity suitable for a condition such as a high speed region where the flow rate of exhaust gas is high. Variable nozzle 13 is structured to be driven by an actuator 14 of a diaphragm type that operates in response to a control pressure (or control negative pressure). The control pressure is generated via a pressure control valve 15 that is controlled by duty control.

Pressure control valve 15 is controlled by a control unit 16 as a control section. Namely, variable nozzle 13 of turbocharger 10 is controlled by control unit 16. Variable nozzle 13 is an exhaust adjustment mechanism structured to adjust a quantity of exhaust gas that is to be brought into exhaust turbine 12 of turbocharger 10, and thereby control a boost pressure of internal combustion engine 1.

Control unit 16 is a well-known digital computer that includes a CPU, a ROM, a RAM, and an input and output interface.

In intake passage 2, an intercooler 17 is provided downstream of throttle valve 6, wherein intercooler 17 is structured to cool intake air compressed (or pressurized) by compressor 11, and thereby enhance efficiency of charging of intake air.

Intercooler 17 is arranged in an intercooler cooling path (or auxiliary cooling path) 20 as well as a radiator (or intercooler radiator) 18 and an electric pump 19. Intercooler 17 is structured to be supplied with a coolant (cooling water) cooled by radiator 18.

Intercooler cooling path 20 is structured to allow the coolant to circulate therein. Intercooler cooling path 20 is independent from a main cooling path not shown where cooling water circulates for cooling a cylinder block 21 of internal combustion engine 1.

Radiator 18 is structured to cool the coolant in intercooler cooling path 20 by heat exchange with outside air.

Electric pump 19 is structured to be driven to allow the coolant to circulate along an arrow in FIG. 1 between radiator 18 and intercooler 17.

Exhaust passage 3 is connected to an exhaust bypass passage 22 that bypasses the exhaust turbine 12 and connects an upstream side of exhaust turbine 12 to a downstream side of exhaust turbine 12. Exhaust bypass passage 22 has a downstream end connected to a portion of exhaust passage 3 upstream of upstream exhaust catalyst 7. A wastegate valve 23 of an electronic type is placed in exhaust bypass passage 22, and structured to control a flow rate of exhaust gas in exhaust bypass passage 22. Wastegate valve 23 is structured to bypass a part of exhaust gas, which is to be brought into exhaust turbine 12, to the downstream side of exhaust turbine 12, and thereby control the boost pressure of internal combustion engine 1. Wastegate valve 23 has a valve opening controlled by control unit 16.

Internal combustion engine 1 includes an EGR passage 24 branched from exhaust passage 3 and connected to intake passage 2, and is structured to perform exhaust gas recirculation (EGR) to bring (recirculate) a part of exhaust gas as an EGR gas from exhaust passage 3 into intake passage 2. EGR passage 24 has a first end connected to a portion of exhaust passage 3 between upstream exhaust catalyst 7 and downstream exhaust catalyst 8, and a second end connected to a portion of intake passage 2 downstream of air flow meter 5 and upstream of compressor 11. In EGR passage 24, an EGR valve 25 and an EGR cooler 26 are provided, wherein EGR valve 25 is of an electronic type and is structured to control the flow rate of EGR gas in EGR passage 24, and wherein EGR cooler 26 is structured to cool the EGR gas. EGR valve 25 is controlled by control unit 16 to open and close.

Control unit 16 is configured to receive input of sensing signals from sensors, i.e. air flow meter 5, a crank angle sensor 27 for sensing a crank angle of a crankshaft not shown, an accelerator opening sensor 28 for sensing a quantity of depression of an accelerator pedal not shown, a boost pressure sensor 29 for sensing an intake air pressure downstream of compressor 11 (i.e. boost pressure), an air fuel ratio sensor 30 for sensing an exhaust air fuel ratio upstream of upstream exhaust catalyst 7, and an oxygen sensor 31 for sensing an exhaust air fuel ratio downstream of upstream exhaust catalyst 7.

Crank angle sensor 27 is structured to sense an engine speed of internal combustion engine 1.

Air fuel ratio sensor 30 is a wide range type air fuel ratio sensor having a linear characteristic of output in proportion to the exhaust air fuel ratio. Oxygen sensor 31 is a sensor structured to sense simply whether the air fuel ratio is rich or lean, wherein its output voltage varies in an on-off manner in a narrow range in vicinity of a theoretical air fuel ratio.

In response to a condition where an operating state of internal combustion engine 1 varies and the intake air quantity of internal combustion engine 1 is to be varied, a valve opening of throttle valve 6 is controlled and one of wastegate valve 23 and variable nozzle 13, which allows thermal energy to be recovered efficiently as a work of boost pressure under this condition, is operated with higher priority to the other. This serves to reduce a pumping loss, and thereby enhance fuel efficiency of the internal combustion engine.

Figure 2:
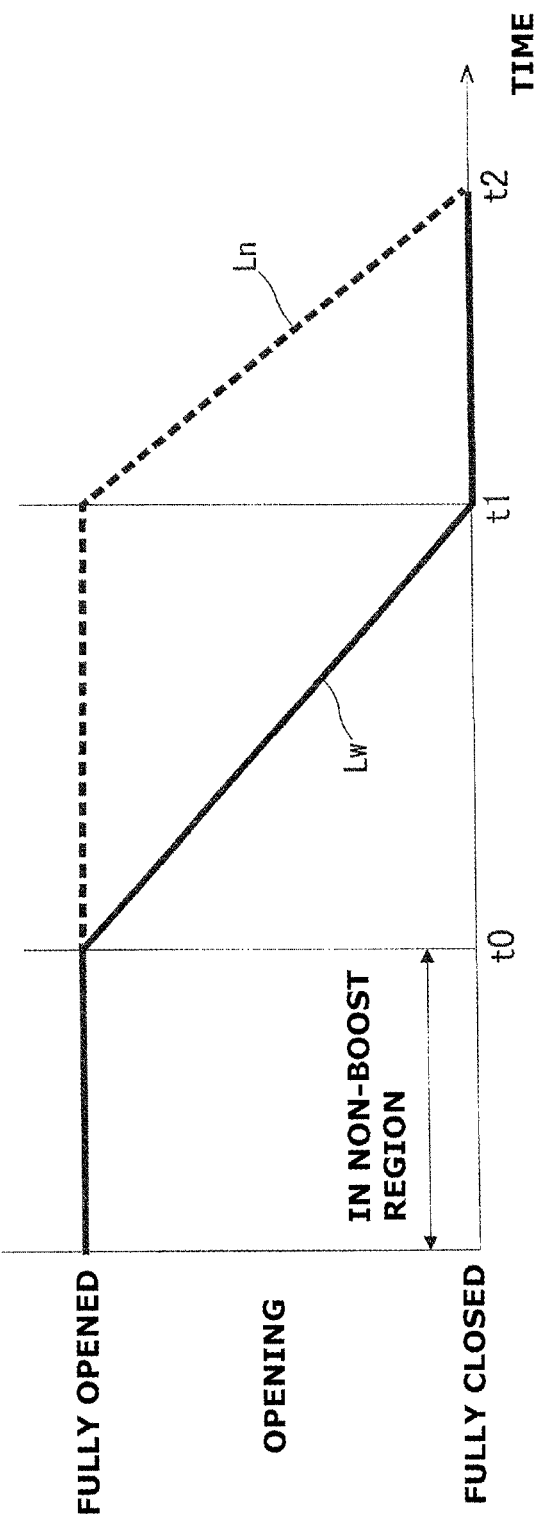
FIG. 2 is a timing chart showing an example of operation of a wastegate valve and a variable nozzle when an intake air quantity is to be increased along with an increase in engine load.

FIG. 2 is a timing chart showing an example of operation of wastegate valve 23 and variable nozzle 13 when the intake air quantity is to be increased along with an increase in engine load (in load of internal combustion engine 1). In FIG. 2, a solid line represents a characteristic line Lw of the valve opening of wastegate valve 23, and a broken line represents a characteristic line Ln of the nozzle opening of variable nozzle 13.

When the engine load rises, and a target boost pressure rises, and the intake air quantity is to be increased, a valve opening reducing operation of wastegate valve 23 is performed with higher priority to a nozzle opening reducing operation of variable nozzle 13. The target boost pressure is set depending on the operating state of internal combustion engine 1 in this example.

Specifically, in the example of FIG. 2, at a time instant t0, the engine load starts to rise, and the target boost pressure starts to rise, and the intake air quantity of internal combustion engine 1 starts to be increased. Accordingly, in FIG. 2, at time instant t0, the valve opening reducing operation of wastegate valve 23 is started. Thereafter, in FIG. 2, at a time instant t1 when wastegate valve 23 has been brought in fully closed state, the nozzle opening reducing operation of variable nozzle 13 is started. The nozzle opening reducing operation of variable nozzle 13 is carried out in case the boost pressure does not reach the target boost pressure even when wastegate valve 23 is in fully closed state.

In FIG. 2, at time instant t0, the operating state shifts from a non-boost region into a boost region. For example, it is possible to determine whether internal combustion engine 1 is in the non-boost region or in the boost region, based on the engine load and the engine speed. In FIG. 2, until time instant t0, both of the valve opening of wastegate valve 23 and the nozzle opening of variable nozzle 13 are maximized (in fully opened state). In FIG. 2, at a time instant t2, the boost pressure becomes equal to the target boost pressure, and the nozzle opening of variable nozzle 13 is minimized (in fully closed state).

The valve opening reducing operation of wastegate valve 23 is an operation to change the valve opening of wastegate valve 23 in a closing direction from a current state. The nozzle opening reducing operation of variable nozzle 13 is an operation to change the nozzle opening of variable nozzle 13 in a reducing direction from a current state.

Figure 3:
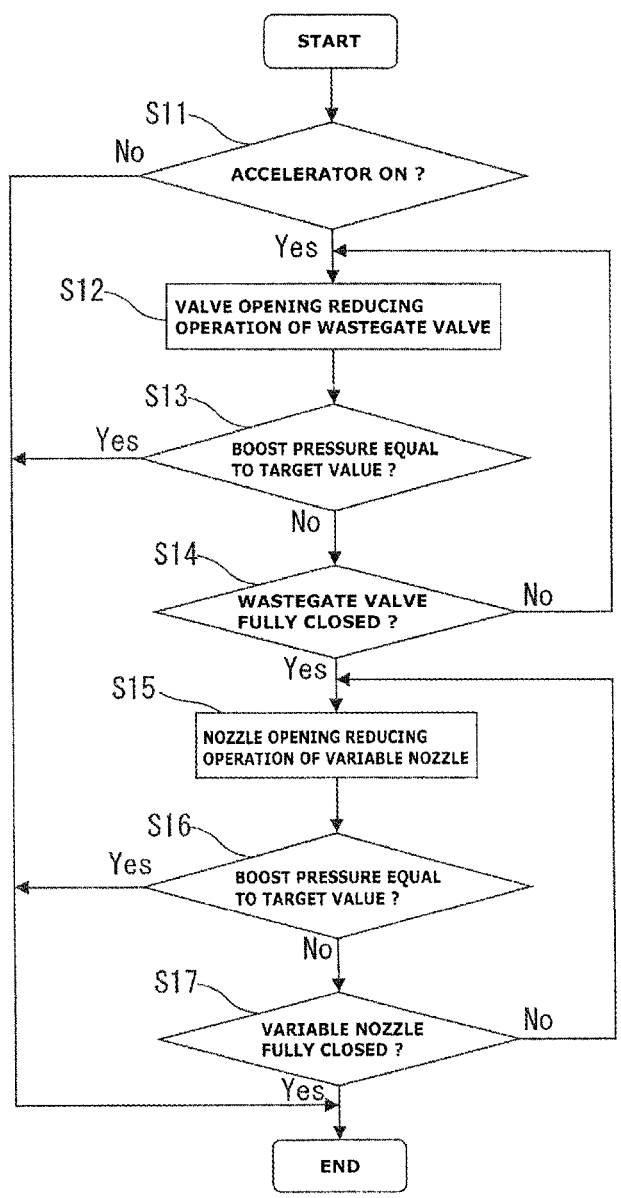
FIG. 3 is a flow chart showing a flow of control of the wastegate valve and the variable nozzle when the intake air quantity is to be increased along with an increase in engine load.

FIG. 3 is a flow chart showing a flow of control of wastegate valve 23 and variable nozzle 13 when the intake air quantity is to be increased along with an increase in the engine load. The control of FIG. 3 is performed by control unit 16.

At Step S11, control unit 16 determines whether or not the accelerator is in on-state. In this example, control unit 16 determines that the accelerator is in on-state, in response to a condition that a driver depresses the accelerator pedal. When determining that the accelerator is in on-state, control unit 16 then proceeds to Step S12. On the other hand, when determining that the accelerator is not in on-state, control unit 16 then terminates the present routine.

At Step S12, control unit 16 performs the valve opening reducing operation of wastegate valve 23 so as to increase the intake air quantity, and thereby conform the boost pressure to the target boost pressure.

At Step S13, control unit 16 determines whether or not the intake air pressure downstream of compressor 11 (i.e. the boost pressure) has risen up to the target boost pressure. When determining that the boost pressure is lower than the target boost pressure, control unit 16 then proceeds from Step S13 to Step S14. When determining that the boost pressure has become equal to the target boost pressure, control unit 16 then terminates the valve opening reducing operation of wastegate valve 23 (thereby maintains the valve opening of wastegate valve 23 at the current state), and terminates the present routine.

At Step S14, control unit 16 determines whether or not wastegate valve 23 is in fully closed state. When determining that wastegate valve 23 is not in fully closed state, control unit 16 then proceeds to Step S12, and continues the valve opening reducing operation of wastegate valve 23. When determining that wastegate valve 23 is in fully closed state, control unit 16 then proceeds to Step S15. The valve opening of wastegate valve 23 may be identified by sensing with a sensor provided, or by estimation from pressures of the upstream and downstream sides of wastegate valve 23.

At Step S15, control unit 16 performs the valve opening reducing operation of wastegate valve 23 so as to increase the intake air quantity, and thereby conform the boost pressure to the target boost pressure. In this way, the nozzle opening reducing operation of variable nozzle 13 is carried out in case the boost pressure does not reach the target boost pressure even when wastegate valve 23 is in fully closed state.

At Step S16, control unit 16 determines whether or not the intake air pressure downstream of compressor 11 (i.e. the boost pressure) has risen up to the target boost pressure. When determining that the boost pressure is lower than the target boost pressure, control unit 16 then proceeds from Step S16 to Step S17. When determining that the boost pressure has become equal to the target boost pressure, control unit 16 then terminates the nozzle opening reducing operation of variable nozzle 13 (thereby maintains the nozzle opening of variable nozzle 13 at the current state), and terminates the present routine.

At Step S17, control unit 16 determines whether or not the nozzle opening of variable nozzle 13 is minimized (in fully closed state). When determining that the nozzle opening of variable nozzle 13 is not minimized (in fully closed state), control unit 16 then proceeds to Step S15, and continues the nozzle opening reducing operation of variable nozzle 13. When determining that the nozzle opening of variable nozzle 13 is minimized (in fully closed state), control unit 16 then terminates the present routine. The nozzle opening of variable nozzle 13 may be identified by sensing with a sensor provided, or by estimation from the pressures of the upstream and downstream sides of exhaust turbine 12.

When wastegate valve 23 is in closed state, thermal energy can be efficiently recovered as a work of the boost pressure than when wastegate valve 23 is in opened state. This is because even if the nozzle opening of variable nozzle 13 is reduced in order to raise pressure energy when wastegate valve 23 is in opened state, pressure is relieved via the wastegate valve 23.

Accordingly, the feature of operating the wastegate valve 23 with higher priority to variable nozzle 13 of turbocharger 10 when the intake air quantity is to be increased due to an increase in the engine load, serves to reduce the pumping loss, and thereby enhance the fuel efficiency of internal combustion engine 1.

Figure 4:
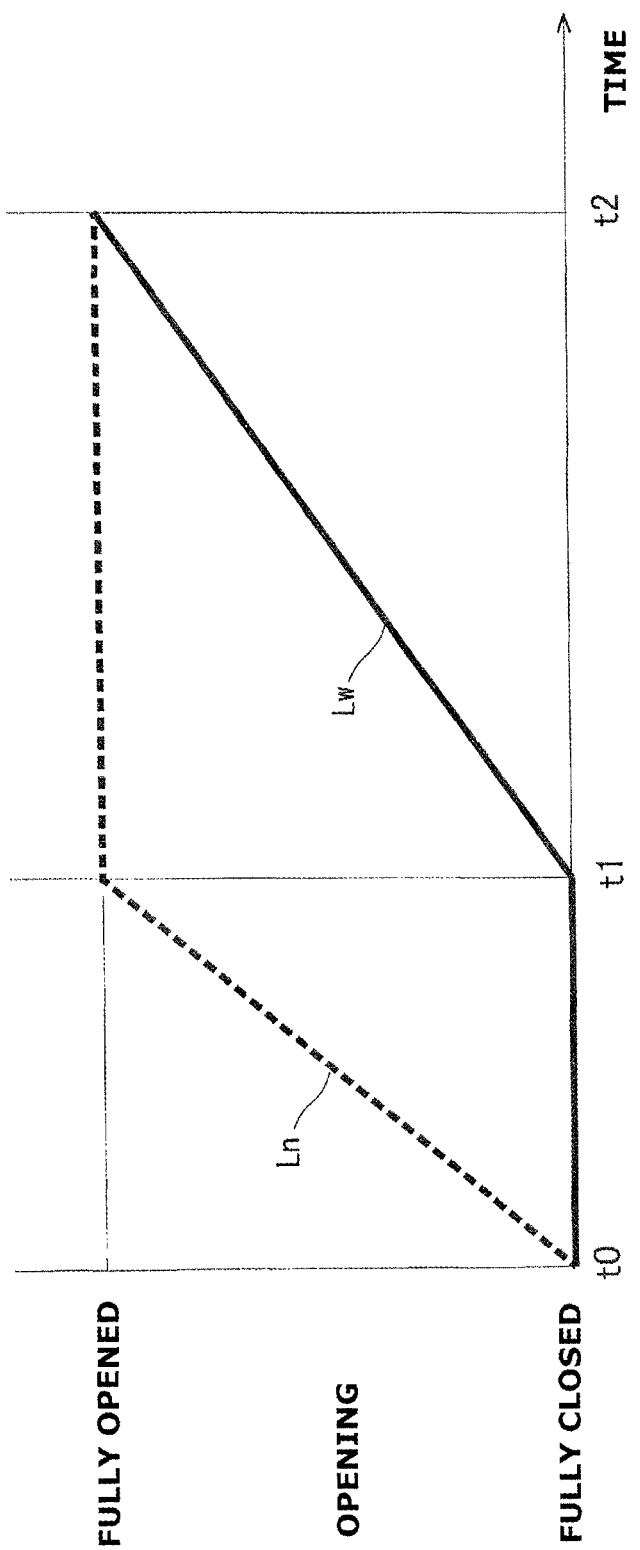
FIG. 4 is a timing chart showing an example of operation of the wastegate valve and the variable nozzle when the intake air quantity is to be reduced along with a decrease in engine load.

FIG. 4 is a timing chart showing an example of operation of wastegate valve 23 and variable nozzle 13 when the intake air quantity is to be reduced along with a decrease in the engine load. In FIG. 4, a solid line represents a characteristic line Lw of the valve opening of wastegate valve 23, and a broken line represents a characteristic line Ln of the nozzle opening of variable nozzle 13.

When the engine load falls, and the target boost pressure falls, and the intake air quantity is to be reduced, a nozzle opening increasing operation of variable nozzle 13 is performed with higher priority to a valve opening increasing operation of wastegate valve 23.

Specifically, in the example of FIG. 4, at a time instant t0, the engine load starts to fall, and the target boost pressure starts to fall, and the intake air quantity of internal combustion engine 1 starts to be reduced. Accordingly, in FIG. 4, at time instant t0, the nozzle opening increasing operation of variable nozzle 13 is started. Thereafter, in FIG. 4, at a time instant t1 when the nozzle opening of variable nozzle 13 is has been maximized (in in fully opened state), the valve opening increasing operation of wastegate valve 23 is started. The valve opening increasing operation of wastegate valve 23 is carried out in case the boost pressure is higher than the target boost pressure even when variable nozzle 13 is in fully opened state.

In FIG. 4, at time instant t0, both of the valve opening of wastegate valve 23 and the nozzle opening of variable nozzle 13 are minimized (in fully closed state). In FIG. 4, at a time instant t2, the boost pressure becomes equal to the target boost pressure, and the valve opening of wastegate valve 23 is fully opened.

The valve opening increasing operation of wastegate valve 23 is an operation to change the valve opening of wastegate valve 23 in an opening direction from a current state. The nozzle opening increasing operation of variable nozzle 13 is an operation to change the nozzle opening of variable nozzle 13 in an increasing direction from a current state.

Figure 5:
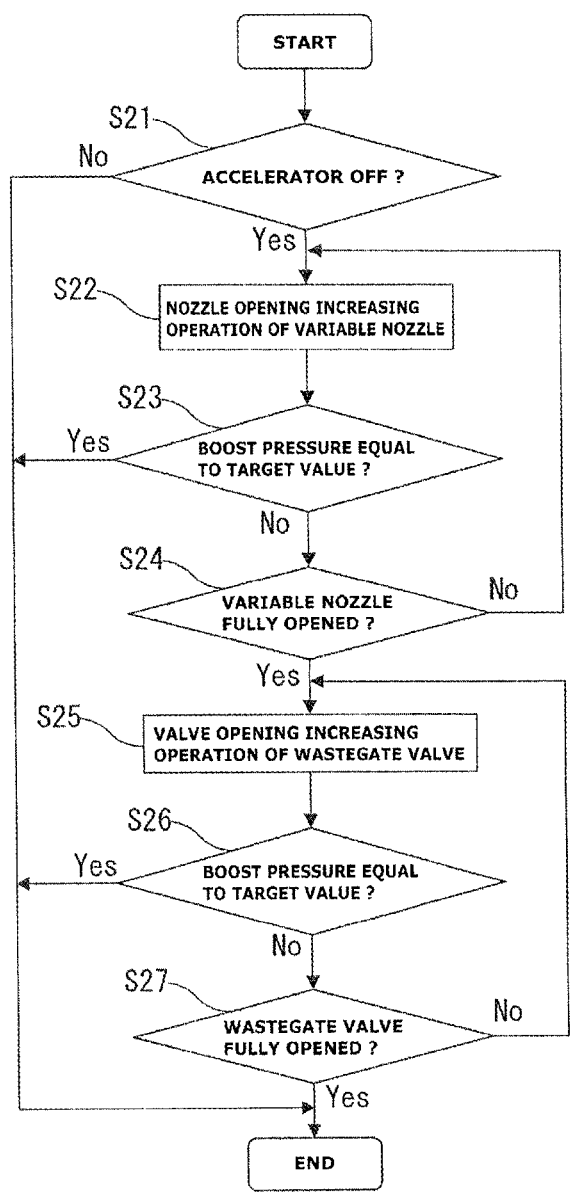
FIG. 5 is a flow chart showing a flow of control of the wastegate valve and the variable nozzle when the intake air quantity is to be reduced along with a decrease in engine load.

FIG. 5 is a flow chart showing a flow of control of wastegate valve 23 and variable nozzle 13 when the intake air quantity is to be reduced along with a decrease in the engine load. The control of FIG. 5 is performed by control unit 16.

At Step S21, control unit 16 determines whether or not the accelerator is in off-state. In this example, control unit 16 determines that the accelerator is in off-state, in response to a condition that a driver releases the accelerator pedal. When determining that the accelerator is in off-state, control unit 16 then proceeds to Step S22. On the other hand, when determining that the accelerator is not in off-state, control unit 16 then terminates the present routine.

At Step S22, control unit 16 performs the nozzle opening increasing operation of variable nozzle 13 so as to reduce the intake air quantity, and thereby conform the boost pressure to the target boost pressure.

At Step S23, control unit 16 determines whether or not the intake air pressure downstream of compressor 11 (i.e. the boost pressure) has fallen down to the target boost pressure. When determining that the boost pressure is higher than the target boost pressure, control unit 16 then proceeds from Step S23 to Step S24. When determining that the boost pressure has become equal to the target boost pressure, control unit 16 then terminates the nozzle opening increasing operation of variable nozzle 13 (thereby maintains the nozzle opening of variable nozzle 13 at the current state), and terminates the present routine.

At Step S24, control unit 16 determines whether or not the nozzle opening of variable nozzle 13 is maximized (in fully opened state). When determining that the nozzle opening of variable nozzle 13 is not maximized (in fully opened state), control unit 16 then proceeds to Step S22, and continues the nozzle opening increasing operation of variable nozzle 13. When determining that the nozzle opening of variable nozzle 13 is maximized (in fully opened state), control unit 16 then proceeds to Step S25.

At Step S25, control unit 16 performs the valve opening increasing operation of wastegate valve 23 so as to reduce the intake air quantity, and thereby conform the boost pressure to the target boost pressure. In this way, the valve opening increasing operation of wastegate valve 23 is carried out in case the boost pressure does not reach the target boost pressure even when the nozzle opening of variable nozzle 13 is maximized (in fully opened state).

At Step S26, control unit 16 determines whether or not the intake air pressure downstream of compressor 11 (i.e. the boost pressure) has reached the target boost pressure. When determining that the boost pressure is higher than the target boost pressure, control unit 16 then proceeds from Step S26 to Step S27. When determining that the boost pressure has become equal to the target boost pressure, control unit 16 then terminates the valve opening increasing operation of wastegate valve 23 (thereby maintains the valve opening of wastegate valve 23 at the current state), and terminates the present routine.

At Step S27, control unit 16 determines whether or not wastegate valve 23 is in fully opened state. When determining that wastegate valve 23 is not in fully opened state, control unit 16 then proceeds to Step S25, and continues the valve opening increasing operation of wastegate valve 23. When determining that wastegate valve 23 is in fully opened state, control unit 16 then terminates the present routine.

When the nozzle opening of variable nozzle 13 is reduced to some extent, thermal energy cannot be recovered efficiently as a work of the boost pressure.

Accordingly, the feature of operating the variable nozzle 13 of turbocharger 10 with higher priority to wastegate valve 23 when the intake air quantity is to be reduced due to a decrease in the engine load, serves to reduce the pumping loss, and thereby enhance the fuel efficiency of internal combustion engine 1.

Figure 6:
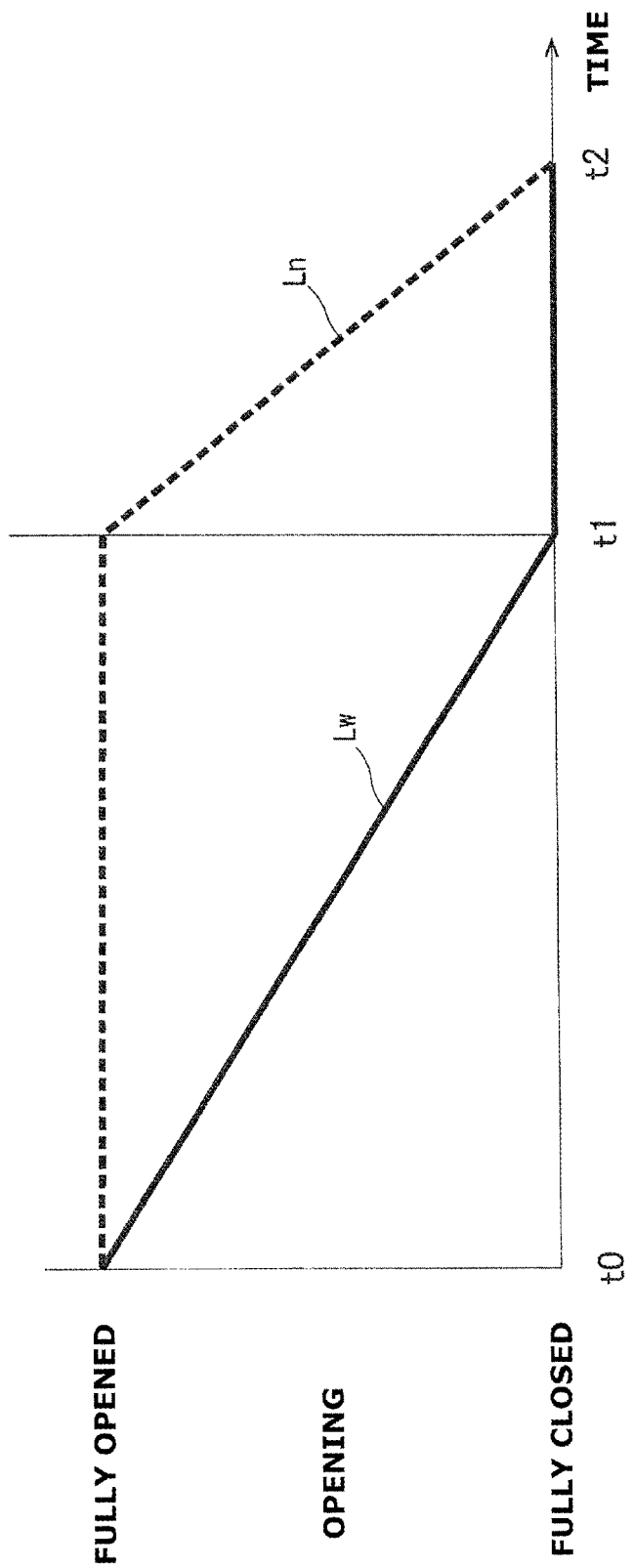
FIG. 6 is a timing chart showing an example of operation of the wastegate valve and the variable nozzle when the intake air quantity is to be increased so as to set an air fuel ratio leaner.

FIG. 6 is a timing chart showing an example of operation of wastegate valve 23 and variable nozzle 13 when the intake air quantity is to be increased so as to set the air fuel ratio leaner. In FIG. 6, a solid line represents a characteristic line Lw of the valve opening of wastegate valve 23, and a broken line represents a characteristic line Ln of the nozzle opening of variable nozzle 13.

When the operating state of internal combustion engine 1 varies and the intake air quantity is to be increased so as to set the air fuel ratio leaner, the valve opening reducing operation of wastegate valve 23 is performed with higher priority to the nozzle opening reducing operation of variable nozzle 13.

Specifically, in the example of FIG. 6, at a time instant t0, a target air fuel ratio starts to become leaner, and the intake air quantity of internal combustion engine 1 starts to be increased. Accordingly, in FIG. 6, at time instant t0, the valve opening reducing operation of wastegate valve 23 is started. Thereafter, in FIG. 6, at a time instant t1 when wastegate valve 23 has been brought in fully closed state, the nozzle opening reducing operation of variable nozzle 13 is started. The nozzle opening reducing operation of variable nozzle 13 is carried out in case the air fuel ratio does not reach the target air fuel ratio even when wastegate valve 23 is in fully closed state. The air fuel ratio is estimated from a sensed value acquired by air fuel ratio sensor 30 in this example. The target air fuel ratio is set depending on the operating state of internal combustion engine 1 in this example.

In FIG. 6, at time instant t0, both of the valve opening of wastegate valve 23 and the nozzle opening of variable nozzle 13 are maximized (in fully opened state). In FIG. 6, at a time instant t2, the air fuel ratio becomes equal to the target air fuel ratio, and the nozzle opening of variable nozzle 13 is minimized (in fully closed state).

Figure 7:
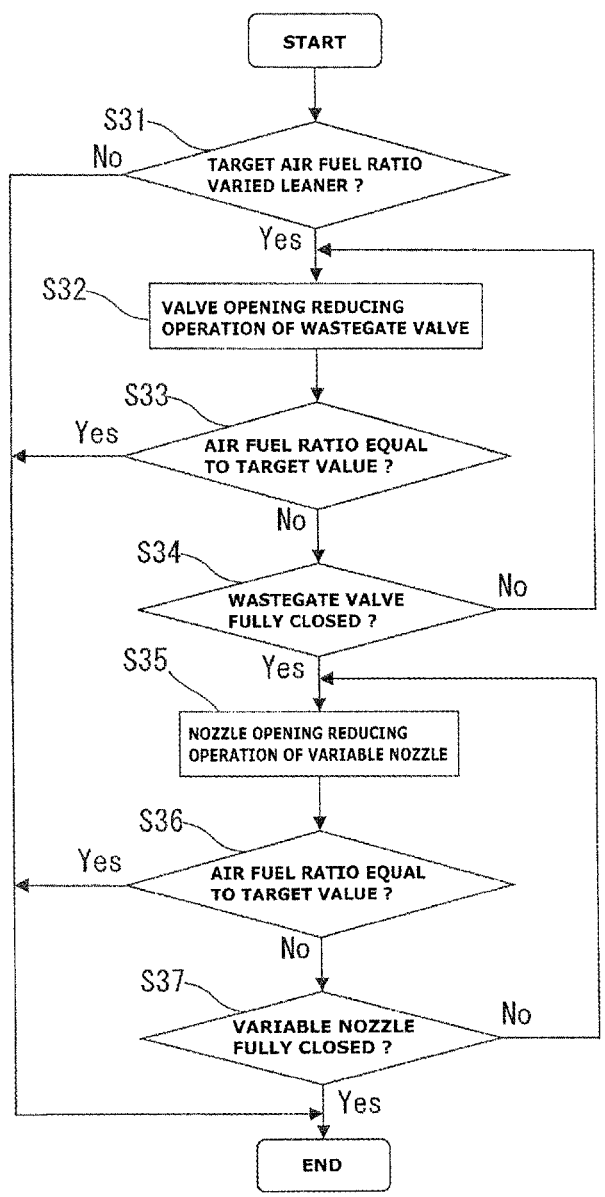
FIG. 7 is a flow chart showing a flow of control of the wastegate valve and the variable nozzle when the intake air quantity is to be increased so as to set the air fuel ratio leaner.

FIG. 7 is a flow chart showing a flow of control of wastegate valve 23 and variable nozzle 13 when the intake air quantity is to be increased so as to set the air fuel ratio leaner. The control of FIG. 7 is performed by control unit 16.

At Step S31, control unit 16 determines whether or not the target air fuel ratio is varied to be leaner. When determining that the target air fuel ratio is varied to be leaner, control unit 16 then proceeds to Step S32. On the other hand, when determining that the target air fuel ratio is not varied to be leaner, control unit 16 then terminates the present routine.

At Step S32, control unit 16 performs the valve opening reducing operation of wastegate valve 23 so as to increase the intake air quantity, and thereby conform the air fuel ratio to the target air fuel ratio.

At Step S33, control unit 16 determines whether or not the air fuel ratio has reached the target air fuel ratio. In other words, control unit 16 determines whether or not an excess air ratio has reached a target value. When determining that the air fuel ratio has not reached the target air fuel ratio, control unit 16 then proceeds from Step S33 to Step S34. Namely, when determining that the excess air ratio has not reached the target value, control unit 16 then proceeds from Step S33 to Step S34. The excess air ratio is estimated from a sensed value acquired by air fuel ratio sensor 30 in this example. When determining that the air fuel ratio has reached the target air fuel ratio, control unit 16 then terminates the valve opening reducing operation of wastegate valve 23 (thereby maintains the valve opening of wastegate valve 23 at the current state), and terminates the present routine.

At Step S34, control unit 16 determines whether or not wastegate valve 23 is in fully closed state. When determining that wastegate valve 23 is not in fully closed state, control unit 16 then proceeds to Step S32, and continues the valve opening reducing operation of wastegate valve 23. When determining that wastegate valve 23 is in fully closed state, control unit 16 then proceeds to Step S35. The valve opening of wastegate valve 23 may be identified by sensing with a sensor provided, or by estimation from pressures of the upstream and downstream sides of wastegate valve 23.

At Step S35, control unit 16 performs the valve opening reducing operation of wastegate valve 23 so as to increase the intake air quantity, and thereby conform the air fuel ratio to the target air fuel ratio. In this way, the nozzle opening reducing operation of variable nozzle 13 is carried out in case the air fuel ratio does not reach the target air fuel ratio even when wastegate valve 23 is in fully closed state.

At Step S36, control unit 16 determines whether or not the air fuel ratio has reached the target air fuel ratio. When determining that the air fuel ratio has not reached the target air fuel ratio, control unit 16 then proceeds from Step S36 to Step S37. Namely, when determining that the excess air ratio has not reached the target value, control unit 16 then proceeds from Step S36 to Step S37. When determining that the air fuel ratio has reached the target air fuel ratio, control unit 16 then terminates the nozzle opening reducing operation of variable nozzle 13 (thereby maintains the nozzle opening of variable nozzle 13 at the current state), and terminates the present routine.

At Step S37, control unit 16 determines whether or not the nozzle opening of variable nozzle 13 is minimized (in fully closed state). When determining that the nozzle opening of variable nozzle 13 is not minimized (in fully closed state), control unit 16 then proceeds to Step S35, and continues the nozzle opening reducing operation of variable nozzle 13. When determining that the nozzle opening of variable nozzle 13 is minimized (in fully closed state), control unit 16 then terminates the present routine. The nozzle opening of variable nozzle 13 may be identified by sensing with a sensor provided, or by estimation from the pressures of the upstream and downstream sides of exhaust turbine 12.

When wastegate valve 23 is in closed state, thermal energy can be efficiently recovered as a work of the air fuel ratio than when wastegate valve 23 is in opened state. This is because even if the nozzle opening of variable nozzle 13 is reduced in order to raise pressure energy when wastegate valve 23 is in opened state, pressure is relieved via the wastegate valve 23.

Accordingly, the feature of operating the wastegate valve 23 with higher priority to variable nozzle 13 of turbocharger 10 when the intake air quantity is to be increased so as to set the air fuel ratio leaner, serves to reduce the pumping loss, and thereby enhance the fuel efficiency of internal combustion engine 1.

Figure 8:
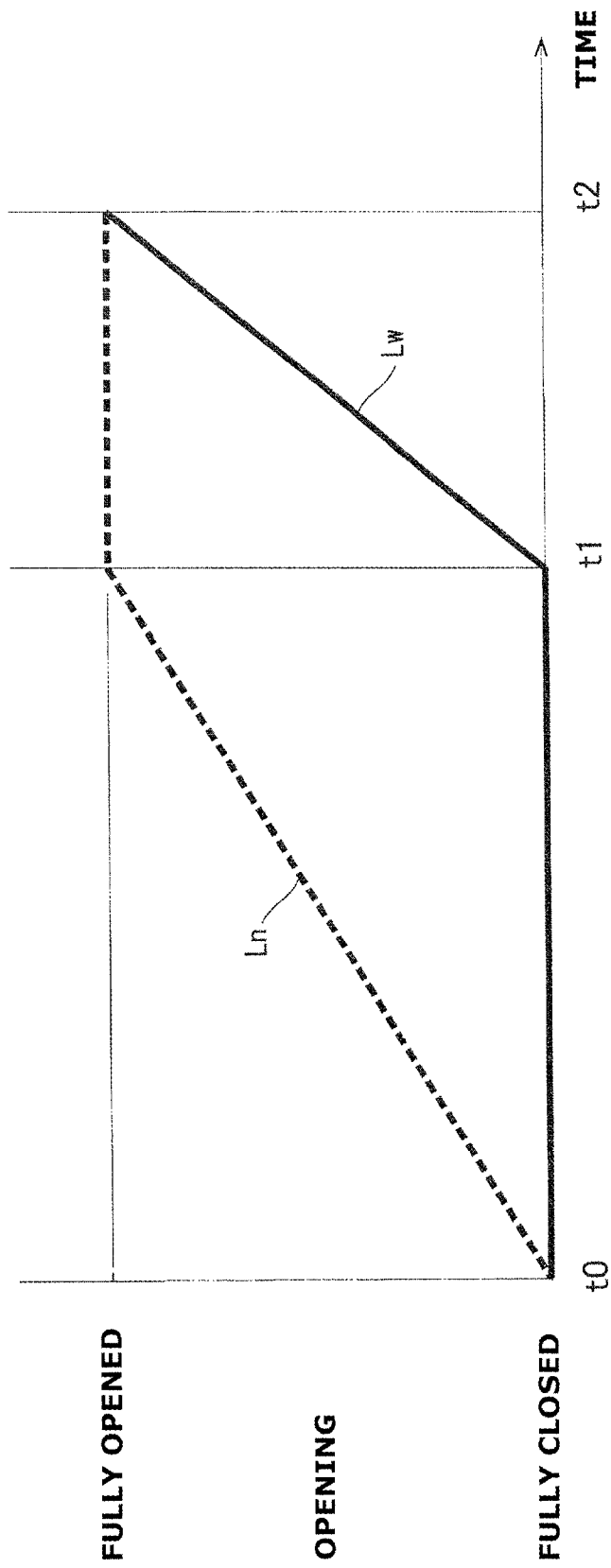
FIG. 8 is a timing chart showing an example of operation of the wastegate valve and the variable nozzle when the intake air quantity is to be reduced so as to set the air fuel ratio richer.

FIG. 8 is a timing chart showing an example of operation of wastegate valve 23 and variable nozzle 13 when the intake air quantity is to be reduced so as to set the air fuel ratio richer. In FIG. 8, a solid line represents a characteristic line Lw of the valve opening of wastegate valve 23, and a broken line represents a characteristic line Ln of the nozzle opening of variable nozzle 13.

When the operating state of internal combustion engine 1 varies and the intake air quantity is to be reduced so as to set the air fuel ratio richer, the nozzle opening increasing operation of variable nozzle 13 is performed with higher priority to the valve opening increasing operation of wastegate valve 23.

Specifically, in the example of FIG. 8, at a time instant t0, the target air fuel ratio starts to become richer, and the intake air quantity of internal combustion engine 1 starts to be reduced. Accordingly, in FIG. 8, at time instant t0, the nozzle opening increasing operation of variable nozzle 13 is started. Thereafter, in FIG. 8, at a time instant t1 when the nozzle opening of variable nozzle 13 is has been maximized (in in fully opened state), the valve opening increasing operation of wastegate valve 23 is started. The valve opening increasing operation of wastegate valve 23 is carried out in case the air fuel ratio does not reach the target air fuel ratio even when the nozzle opening of variable nozzle 13 is maximized (in fully opened state).

In FIG. 8, at time instant t0, both of the valve opening of wastegate valve 23 and the nozzle opening of variable nozzle 13 are minimized (in fully closed state). In FIG. 8, at a time instant t2, the air fuel ratio becomes equal to the target air fuel ratio, and the valve opening of wastegate valve 23 is in fully opened state.

Figure 9:
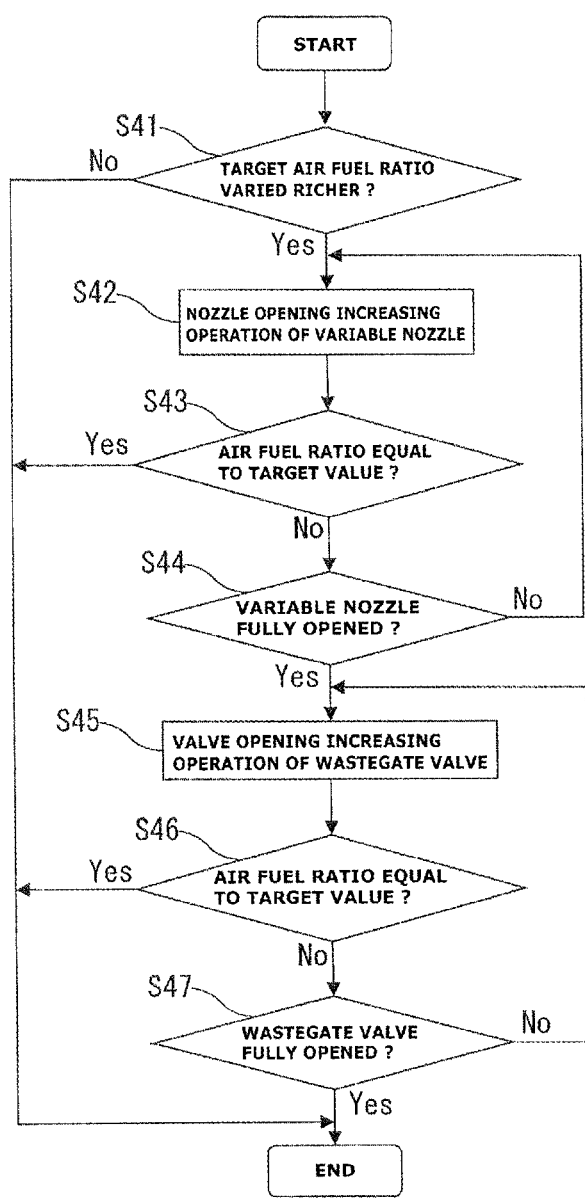
FIG. 9 is a flow chart showing a flow of control of the wastegate valve and the variable nozzle when the intake air quantity is to be reduced so as to set the air fuel ratio richer.

FIG. 9 is a flow chart showing a flow of control of wastegate valve 23 and variable nozzle 13 when the intake air quantity is to be reduced so as to set the air fuel ratio richer. The control of FIG. 9 is performed by control unit 16.

At Step S41, control unit 16 determines whether or not the target air fuel ratio is varied to be richer. When determining that the target air fuel ratio is varied to be richer, control unit 16 then proceeds to Step S42. On the other hand, when determining that the target air fuel ratio is not varied to be richer, control unit 16 then terminates the present routine.

At Step S42, control unit 16 performs the nozzle opening increasing operation of variable nozzle 13 so as to reduce the intake air quantity, and thereby conform the air fuel ratio to the target air fuel ratio.

At Step S43, control unit 16 determines whether or not the air fuel ratio has reached the target air fuel ratio. When determining that the air fuel ratio has not reached the target air fuel ratio, control unit 16 then proceeds from Step S43 to Step S44. Namely, when determining that the excess air ratio has not reached the target value, control unit 16 then proceeds from Step S43 to Step S44. When determining that the air fuel ratio has reached the target air fuel ratio, control unit 16 then terminates the nozzle opening increasing operation of variable nozzle 13 (thereby maintains the nozzle opening of variable nozzle 13 at the current state), and terminates the present routine.

At Step S44, control unit 16 determines whether or not the nozzle opening of variable nozzle 13 is maximized (in fully opened state). When determining that the nozzle opening of variable nozzle 13 is not maximized (in fully opened state), control unit 16 then proceeds to Step S42, and continues the nozzle opening increasing operation of variable nozzle 13. When determining that the nozzle opening of variable nozzle 13 is maximized (in fully opened state), control unit 16 then proceeds to Step S45.

At Step S45, control unit 16 performs the valve opening increasing operation of wastegate valve 23 so as to reduce the intake air quantity, and thereby conform the air fuel ratio to the target air fuel ratio. In this way, the valve opening increasing operation of wastegate valve 23 is carried out in case the air fuel ratio does not reach the target air fuel ratio even when the nozzle opening of variable nozzle 13 is maximized (in fully opened state).

At Step S46, control unit 16 determines whether or not the air fuel ratio has reached the target air fuel ratio. When determining that the air fuel ratio has not reached the target air fuel ratio, control unit 16 then proceeds from Step S46 to Step S47. Namely, when determining that the excess air ratio has not reached the target value, control unit 16 then proceeds from Step S46 to Step S47. When determining that the air fuel ratio has reached the target air fuel ratio, control unit 16 then terminates the valve opening increasing operation of wastegate valve 23 (thereby maintains the valve opening of wastegate valve 23 at the current state), and terminates the present routine.

At Step S47, control unit 16 determines whether or not wastegate valve 23 is in fully opened state. When determining that wastegate valve 23 is not in fully opened state, control unit 16 then proceeds to Step S45, and continues the valve opening increasing operation of wastegate valve 23. When determining that wastegate valve 23 is in fully opened state, control unit 16 then terminates the present routine.

When the nozzle opening of variable nozzle 13 is reduced to some extent, thermal energy cannot be recovered efficiently as a work of the boost pressure.

Accordingly, the feature of operating the variable nozzle 13 of turbocharger 10 with higher priority to wastegate valve 23 when the intake air quantity is to be reduced so as to set the air fuel ratio richer, serves to reduce the pumping loss, and thereby enhance the fuel efficiency of internal combustion engine 1.

The configuration according to the present embodiment that the quantity of exhaust gas brought into exhaust turbine 12 can be adjusted by variable nozzle 13, may be modified such that the exhaust adjustment mechanism is not implemented by variable nozzle 13 but implemented by providing a flow rate control valve structured to vary a cross-sectional area of a path upstream of exhaust turbine 12 (flow path cross-sectional area).

The invention claimed is:

1. An internal combustion engine control method for an internal combustion engine,
the internal combustion engine including:
a turbocharger including:
a compressor disposed in an intake passage; and
an exhaust turbine disposed in an exhaust passage;
a wastegate valve structured to allow a part of exhaust gas to bypass the exhaust turbine and flow into a downstream side of the exhaust turbine, wherein the exhaust gas is to be brought into the exhaust turbine; and
an exhaust adjustment mechanism structured to adjust a quantity of the exhaust gas;
the internal combustion engine control method comprising:
operating a first one of the wastegate valve and the exhaust adjustment mechanism with higher priority to a second one of the wastegate valve and the exhaust adjustment mechanism in response to a condition where an intake air quantity is to be varied along with a variation in engine load or air fuel ratio, wherein operation of the first one allows thermal energy to be recovered more efficiently under the condition than that of the second one.

2. The internal combustion engine control method as claimed in claim 1, comprising:
performing a valve opening reducing operation of the wastegate valve with higher priority to operation of the exhaust adjustment mechanism, in response to a condition where the intake air quantity is to be increased along with an increase in engine load.

3. The internal combustion engine control method as claimed in claim 2, comprising:
starting to perform an opening reducing operation of the exhaust adjustment mechanism after the wastegate valve is brought into fully-closed state in response to a condition where the intake air quantity is to be increased along with an increase in engine load.

4. The internal combustion engine control method as claimed in claim 1, comprising:
performing an opening increasing operation of the exhaust adjustment mechanism with higher priority to operation of the wastegate valve, in response to a condition where the intake air quantity is to be reduced along with a decrease in engine load.

5. The internal combustion engine control method as claimed in claim 4, comprising:
starting to perform a valve opening increasing operation of the wastegate valve after the exhaust adjustment mechanism is brought into fully-opened state in response to a condition where the intake air quantity is to be reduced along with a decrease in engine load.

6. The internal combustion engine control method as claimed in claim 1, comprising:
performing a valve opening reducing operation of the wastegate valve with higher priority to operation of the exhaust adjustment mechanism, in response to a condition where the intake air quantity is to be increased so as to set an air fuel ratio leaner.

7. The internal combustion engine control method as claimed in claim 6, comprising:
starting to perform an opening reducing operation of the exhaust adjustment mechanism after the wastegate valve is brought into fully-closed state in response to a condition where the intake air quantity is to be increased so as to set the air fuel ratio leaner.

8. The internal combustion engine control method as claimed in claim 1, comprising:
performing an opening increasing operation of the exhaust adjustment mechanism with higher priority to operation of the wastegate valve, in response to a condition where the intake air quantity is to be reduced so as to set an air fuel ratio richer.

9. The internal combustion engine control method as claimed in claim 8, comprising:
starting to perform a valve opening increasing operation of the wastegate valve after the exhaust adjustment mechanism is brought into fully-opened state in response to a condition where the intake air quantity is to be increased so as to set the air fuel ratio richer.

10. An internal combustion engine control device for an internal combustion engine,
the internal combustion engine including:
a turbocharger including:
a compressor disposed in an intake passage; and
an exhaust turbine disposed in an exhaust passage;
a wastegate valve structured to allow a part of exhaust gas to bypass the exhaust turbine and flow into a downstream side of the exhaust turbine, wherein the exhaust gas is to be brought into the exhaust turbine; and
an exhaust adjustment mechanism structured to adjust a quantity of the exhaust gas;

the internal combustion engine control device comprising:
a control section configured to operate a first one of the wastegate valve and the exhaust adjustment mechanism with higher priority to a second one of the wastegate valve and the exhaust adjustment mechanism in response to a condition where an intake air quantity is to be varied along with a variation in engine load or air fuel ratio, wherein operation of the first one allows thermal energy to be recovered more efficiently under the condition than that of the second one.

* * * * *